(12) United States Patent
Yoon et al.

(10) Patent No.: US 8,986,892 B2
(45) Date of Patent: Mar. 24, 2015

(54) SEPARATOR INCLUDING POROUS COATING LAYER, METHOD FOR MANUFACTURING THE SEPARATOR AND ELECTROCHEMICAL DEVICE INCLUDING THE SEPARATOR

(75) Inventors: Su-Jin Yoon, Daejeon (KR); Pil-Kyu Park, Daejeon (KR); Jong-Hun Kim, Daejeon (KR); Jin-Nyoung Yoo, Daejeon (KR); In-Chul Kim, Daejeon (KR); Sang-Young Lee, Chuncheon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/243,081

(22) Filed: Sep. 23, 2011

(65) Prior Publication Data

US 2012/0015228 A1    Jan. 19, 2012

Related U.S. Application Data

(63) Continuation of application No. PCT/KR2010/002106, filed on Apr. 6, 2010.

(30) Foreign Application Priority Data

Apr. 10, 2009  (KR) .......................... 10-2009-0031234
Apr. 5, 2010   (KR) .......................... 10-2010-0030996

(51) Int. Cl.
H01M 2/16     (2006.01)
H01M 10/052   (2010.01)

(52) U.S. Cl.
CPC .............. *H01M 2/166* (2013.01); *H01M 2/162* (2013.01); *H01M 2/1653* (2013.01); *H01M 2/1666* (2013.01); *H01M 10/052* (2013.01); Y02E 60/122 (2013.01)
USPC .......................................... 429/251; 429/254

(58) Field of Classification Search
USPC .................. 429/129, 142, 144, 145, 251, 254
See application file for complete search history.

(56) References Cited

U.S. PATENT DOCUMENTS

| | | | | |
|---|---|---|---|---|
| 5,453,333 A | * | 9/1995 | Takauchi et al. ................. | 429/62 |
| 5,656,392 A | * | 8/1997 | Sano et al. ..................... | 429/329 |
| 6,537,695 B2 | * | 3/2003 | McLoughlin et al. ......... | 429/122 |
| 7,655,360 B2 | | 2/2010 | Hennige et al. | |
| 7,704,641 B2 | | 4/2010 | Yong et al. | |
| 2005/0221165 A1 | | 10/2005 | Hennige et al. | |
| 2007/0099072 A1 | | 5/2007 | Hennige et al. | |
| 2007/0264577 A1 | | 11/2007 | Katayama et al. | |

FOREIGN PATENT DOCUMENTS

| | | | | |
|---|---|---|---|---|
| CN | 101218695 A | 7/2008 | | |
| EP | 0 550 262 A1 | 7/1993 | | |
| EP | 1 965 454 A1 | 9/2008 | | |
| JP | 2006-164761 A | 6/2006 | | |
| JP | 2008-192483 A | 8/2008 | | |
| KR | 10-2006-0021222 A | 3/2006 | | |
| KR | 10-2007-0000231 A | 1/2007 | | |
| KR | 10-2007-0019958 A | 2/2007 | | |
| KR | 10-2008-0106718 A | 12/2008 | | |
| KR | 10-2009-0051546 A | 5/2009 | | |
| WO | WO2007/061269 | * | 5/2007 | .............. H01M 2/14 |
| WO | WO 2009/066916 A2 | 5/2009 | | |

OTHER PUBLICATIONS

International Search Report for International Patent Application No. PCT/KR2010/002106; mailed on Nov. 4, 2010.

* cited by examiner

*Primary Examiner* — Muhammad Siddiquee
(74) *Attorney, Agent, or Firm* — Birch, Stewart, Kolasch & Birch, LLP

(57) ABSTRACT

A separator includes a non-woven fabric substrate having pores, fine thermoplastic powder located inside the pores of the non-woven fabric substrate, and a porous coating layer disposed on at least one surface of the non-woven fabric substrate. The fine thermoplastic powder has an average diameter smaller than that of the pores and a melting point lower than the melting or decomposition point of the non-woven fabric substrate. The porous coating layer includes a mixture of inorganic particles and a binder polymer whose melting point is higher than the melting or decomposition point of the fine thermoplastic powder. In the porous coating layer, the inorganic particles are fixedly connected to each other by the binder polymer and the pores are formed by interstitial volumes between the inorganic particles. Previous filling of the large pores of the non-woven fabric substrate with the fine thermoplastic powder makes the porous coating layer uniform.

24 Claims, 1 Drawing Sheet ized application fields of energy storage technologies have been extended to mobile phones, camcorders, notebook computers and even electric cars, efforts have increasingly been made towards the research and development of electrochemical devices. Under these circumstances, secondary batteries capable of repeatedly charging and discharging, in particular, have attracted considerable attention as the most promising electrochemical devices. In recent years, extensive research and development has been conducted to design new electrodes and batteries for the purpose of improving capacity density and specific energy of the batteries.

SEPARATOR INCLUDING POROUS COATING LAYER, METHOD FOR MANUFACTURING THE SEPARATOR AND ELECTROCHEMICAL DEVICE INCLUDING THE SEPARATOR

CROSS-REFERENCE TO RELATED APPLICATION

This application is a continuation of International Application No. PCT/KR2010/002106 filed on Apr. 6, 2010, which claims priority under 35 USC 119(a) to Korean Patent Application Nos. 10-2009-0031234 and 10-2010-0030996 filed in the Republic of Korea on Apr. 10, 2009 and Apr. 5, 2010, respectively, the entire contents of which are incorporated herein by reference.

TECHNICAL FIELD

The present invention relates to a separator for an electrochemical device such as a lithium secondary battery, a method for manufacturing the separator, and an electrochemical device including the separator. More specifically, the present invention relates to a separator in which a porous coating layer composed of a mixture of inorganic particles and at least one binder polymer is formed on at least one surface of a non-woven fabric substrate, a method for manufacturing the separator, and an electrochemical device including the separator.

BACKGROUND ART

Recently, there has been increasing interest in energy storage technologies. As the application fields of energy storage technologies have been extended to mobile phones, camcorders, notebook computers and even electric cars, efforts have increasingly been made towards the research and development of electrochemical devices. Under these circumstances, secondary batteries capable of repeatedly charging and discharging, in particular, have attracted considerable attention as the most promising electrochemical devices. In recent years, extensive research and development has been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni-MH batteries, Ni—Cd batteries, and $H_2SO_4$—Pb batteries. However, such lithium ion batteries suffer from safety problems, such as fire or explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause short circuits between a cathode and an anode.

In order to solve the above safety problems of electrochemical devices, a separator including a highly porous substrate and a porous coating layer formed on at least one surface of the porous substrate wherein the porous coating layer is formed by coating with a mixture of inorganic particles and a binder polymer has been proposed. For example, Korean Unexamined Patent Publication No. 2007-0019958 discloses a technique related to a separator including a porous substrate and a porous coating layer formed on the porous substrate wherein the porous coating layer is composed of a mixture of inorganic particles and a binder polymer.

When such a separator including a porous coating layer employs a non-woven fabric as a porous substrate, due to the presence of large pores in the non-woven fabric, charging failure or leakage current is caused which leads to a problem of a longer constant voltage (CV) region. Further, when a pressure is applied to the separator in the fabrication process of a battery, the porous coating layer is pushed into the non-woven fabric through the large pores of the non-woven fabric, causing the above problems to become more serious. In the meantime, separators including porous coating layers are required to have a shutdown function in order to ensure improved stability of batteries against thermal runaway.

DISCLOSURE

Technical Problem

The present invention is designed to solve the problems of the prior art, and therefore it is an object of the present invention to provide a separator including a non-woven fabric substrate and a porous coating layer formed on the non-woven fabric substrate so that the occurrence of charging failure and leakage current can be avoided to prevent the constant current (CV) region from lengthening while possessing a shutdown function.

It is another object of the invention to provide a method for manufacturing the separator.

It is still another object of the invention to provide an electrochemical device including the separator.

Technical Solution

According to an aspect of the present invention, there is provided a separator including (a) a non-woven fabric substrate having pores, (b) fine thermoplastic powder located inside the pores of the non-woven fabric substrate and having an average diameter smaller than that of the pores of the non-woven fabric substrate and a melting point lower than the melting point or decomposition point of the non-woven fabric substrate, and (c) a porous coating layer disposed on at least one surface of the non-woven fabric substrate and including a mixture of inorganic particles and at least one binder polymer whose melting point is higher than the melting point or decomposition point of the fine thermoplastic powder, the inorganic particles being fixedly connected to each other by the binder polymer and the pores of the coating layer being formed by interstitial volumes between the inorganic particles.

Preferably, the non-woven fabric substrate is composed of microfibers having an average diameter of 0.5 to 10 µm and has a pore size distribution in which at least 50% of the pores have a longest diameter of 0.1 to 70 µm.

The non-woven fabric substrate preferably has a melting point or a decomposition point of at least 200° C. and the fine thermoplastic powder may be fine powder of polyvinylidene fluoride, polyethylene, polystyrene, etc.

According to another aspect of the present invention, there is provided a method for manufacturing a separator, the method including (S1) preparing a non-woven fabric substrate having pores, (S2) distributing fine thermoplastic powder having an average diameter smaller than that of the pores of the non-woven fabric substrate and a melting point lower than the melting point or decomposition point of the non-woven fabric substrate, on at least one surface of the non-woven fabric substrate, and (S3) dispersing inorganic particles in a solution of at least one binder polymer whose melting point or decomposition point is higher than the melting point of the fine thermoplastic powder to prepare a slurry, applying the slurry to the non-woven fabric substrate, on which the fine powder is distributed, and drying the slurry to form a porous coating layer, the inorganic particles being fixedly connected to each other by the binder polymer and the pores of the coating layer being formed by interstitial volumes between the inorganic particles.

According to yet another aspect of the present invention, there is provided an electrochemical device including a cathode, an anode and the separator interposed between the electrodes. The electrochemical device may be, for example, a lithium secondary battery or a supercapacitor device.

Advantageous Effects

The separator of the present invention has a structure in which a porous coating layer is formed on a non-woven fabric substrate whose large pores are filled with fine thermoplastic powder. Due to this structure, the separator of the present invention exhibits the following advantageous effects.

First, previous filling of large pores of the non-woven fabric with the fine thermoplastic powder makes the porous coating layer uniform and maintains the uniformity of the porous coating layer even when the separator is pressurized in the fabrication process of a battery. Therefore, the occurrence of charging failure and leakage current can be avoided, thus preventing the constant voltage (CV) region from lengthening.

Second, when thermal runaway occurs in an electrochemical device, the fine thermoplastic powder melts and closes the pores of the non-woven fabric to suppress electrochemical reactions from proceeding.

Third, the porous coating layer maintains its shape even when thermal runaway of an electrochemical device causes partial damage to the non-woven fabric substrate. Therefore, short circuits between a cathode and an anode of the electrochemical device can be suppressed, thereby improving the safety of the electrochemical device.

DESCRIPTION OF DRAWINGS

Other objects and aspects of the present invention will become apparent from the following descriptions of the embodiments with reference to the accompanying drawings in which.

BEST MODE

Figure 1:
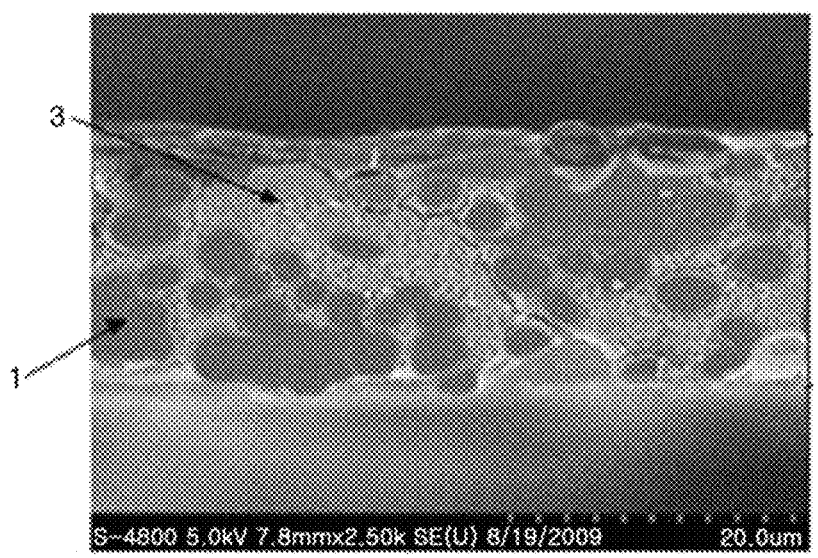
FIG. 1 is a cross-sectional scanning electron microscope (SEM) image of a non-woven fabric substrate after fine thermoplastic powder was distributed on the non-woven fabric substrate in Example 1.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

The present invention provides a separator including (a) a non-woven fabric substrate having pores, (b) fine thermoplastic powder located inside the pores of the non-woven fabric substrate and having an average diameter smaller than that of the pores of the non-woven fabric substrate and a melting point lower than the melting point or decomposition point of the non-woven fabric substrate, and (c) a porous coating layer disposed on at least one surface of the non-woven fabric substrate and including a mixture of inorganic particles and at least one binder polymer whose melting point is higher than the melting point or decomposition point of the fine thermoplastic powder, the inorganic particles being fixedly connected to each other by the binder polymer and the pores of the coating layer being formed by interstitial volumes between the inorganic particles.

(a) Non-Woven Fabric Substrate

The non-woven fabric substrate has pores and serves to maintain the insulation between both electrodes of an electrochemical device. The non-woven fabric substrate may be any of those that are commonly used as substrates for separators in the art. Preferably, the non-woven fabric substrate has a pore size distribution in which at least 50% of the pores have a longest diameter of 0.1 to 70 µm. To this end, microfibers having an average diameter of 0.5 to 10 µm, preferably 1 to 7 µm, are used as materials for the non-woven fabric substrate. A non-woven fabric having a plurality of pores whose longest diameter is smaller than 0.1 µm is difficult to produce. A non-woven fabric having a longest diameter exceeding 70 µm may suffer from the problem of insulation deterioration. The use of the non-woven fabric substrate having the pore size distribution defined above makes the separator suitable for use in a high-capacity battery while ensuring good insulation of the separator.

Examples of suitable materials for the microfibers constituting the non-woven fabric substrate include, but are not limited to, polyolefins such as polyethylene and polypropylene, polyesters such as polyethylene terephthalate and polybutylene terephthalate, polyamides such as aramids, polyacetals, polycarbonates, polyimides, polyether ether ketones, polyethersulfones, polyphenylene oxides, polyphenylene sulfides, and polyethylene naphthalates. It is particularly preferred that the microfibers have a melting point of at least 200° C., which is advantageous in terms of thermal safety of the non-woven fabric substrate. Preferably, the non-woven fabric substrate has a thickness of 9 to 30 μm.

(b) Fine Thermoplastic Powder

The fine thermoplastic powder is located inside the pores of the non-woven fabric substrate and has an average diameter smaller than that of the pores of the non-woven fabric substrate and a melting point lower than the melting point or decomposition point of the non-woven fabric substrate. The average diameter of the fine thermoplastic powder is smaller than the pores present in the non-woven fabric, which enables filling of the larger pores of the non-woven fabric with the smaller fine thermoplastic powder, making the porous coating layer, which will be described below, uniform in thickness without falling into the pores of the non-woven fabric. Thus, the uniformity of the porous coating layer is maintained even when a pressure is applied to the separator in the fabrication process of a battery. It should, of course, be understood that a portion of the fine thermoplastic powder that remains after filling the pores of the non-woven fabric substrate may be located on the surface of the non-woven fabric substrate. The average diameter of the fine thermoplastic powder is not limited so long as the role of the fine thermoplastic powder can be achieved. For example, the average diameter of the fine thermoplastic powder may be in the range of 0.1 to 10 μm.

The fine thermoplastic powder has a melting point lower than the melting point or decomposition point of the non-woven fabric substrate. Therefore, when an electrochemical device using the separator of the present invention overheats, the fine thermoplastic powder melts and closes the pores of the non-woven fabric (i.e. it exhibits shutdown effects) to inhibit electrochemical reactions from proceeding.

It should be noted that the term 'decomposition point' is used herein instead of the term 'melting point' in the case of an object composed of a thermosetting polymer that decomposes before melting. Accordingly, the fine thermoplastic powder melts earlier than the melting or decomposition of the non-woven fabric substrate. The fine thermoplastic powder preferably has a melting point of 80 to 150° C., more preferably 100 to 150° C. Examples of fine thermoplastic powder suitable for use in the separator include, but are not limited to, fine powder of polyvinylidene fluoride, polyethylene and polystyrene.

(c) Porous Coating Layer

The porous coating layer is disposed on at least one surface of the non-woven fabric substrate. The porous coating layer includes a mixture of inorganic particles and at least one binder polymer. The treatment with the fine thermoplastic powder permits the porous coating layer to be uniformly formed on the non-woven fabric substrate. The inorganic particles included in the porous coating layer are fixedly connected to each other by the binder polymer and the pores of the coating layer are formed by interstitial volumes between the inorganic particles.

The inorganic particles are not specifically limited so long as they are electrochemically stable. In other words, the inorganic particles can be used without particular limitation in the present invention if they do not undergo oxidation and/or reduction in an operating voltage range applied to an electrochemical device (for example, 0-5 V for Li/Li$^+$). In particular, a high dielectric constant of the inorganic particles can contribute to an increase in the degree of dissociation of a salt (e.g., a lithium salt) in a liquid electrolyte to improve the ionic conductivity of the electrolyte.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC particles. These inorganic particles may be used alone or as a mixture of two or more kinds thereof.

The inorganic particles may be those having the ability to transport lithium ions, that is, those containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$-$9Al_2O_3$-$38TiO_2$-$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as LiI—$Li_2S$—$P_2S_5$ particles. These inorganic particles may be used alone or as a mixture of two or more kinds thereof.

The average diameter of the inorganic particles is not limited but is preferably in the range of 0.001 to 10 μm. Within this range, a uniform thickness and an optimal porosity of the coating layer can be obtained. An average diameter of less than 0.001 μm may cause deterioration of dispersibility. Meanwhile, an average diameter exceeding 10 μm may increase the thickness of the coating layer.

The binder polymer contained in the porous coating layer may be any of those that are commonly used in forming porous coating layers on non-woven fabric substrates in the art. The binder polymer has a melting point or a decomposition point higher than the melting point of the fine thermoplastic powder. The binder polymer preferably has a melting point or a decomposition point of at least 200° C. It is more preferred that the melting point or decomposition point of the binder polymer be higher than that of the non-woven fabric substrate, which is particularly advantageous in terms of the thermal stability of the separator.

The binder polymer preferably has a glass transition temperature ($T_g$) in the range of −200° C. to 200° C. Within this range, the mechanical properties (e.g., flexibility and elasticity) of the porous coating layer can be improved. The binder polymer acts as a binder to stably and fixedly connect between the inorganic particles or between the inorganic particles and the non-woven fabric substrate.

The binder polymer does not necessarily need to have the ability to conduct ions. However, since the ionic conductivity of the binder polymer can further improve the performance of an electrochemical device using the separator, it is preferred that the dielectric constant of the binder polymer is as high as possible. In practice, the degree of dissociation of a salt in an electrolyte is dependent on the dielectric constant of a solvent in the electrolyte. Therefore, the higher the dielectric constant of the binder polymer is the higher the degree of dissociation of a salt in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $\text{Mpa}^{1/2}$, more preferably between 15 and 25 $\text{Mpa}^{1/2}$ and between 30 and 45 $\text{Mpa}^{1/2}$. Accordingly, a hydrophilic polymer having many polar groups is preferred as the binder polymer over a hydrophobic polymer such as a polyolefin. A solubility parameter less than 15 $\text{Mpa}^{1/2}$ or exceeding 45 $\text{Mpa}^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose.

The weight ratio between the inorganic particles and the binder polymer constituting the porous coating layer formed on the non-woven fabric substrate is preferably between 50:50 and 99:1, more preferably between 70:30 and 95:5. If the inorganic particles are present in an amount of less than 50% by weight (i.e. the binder polymer is present in a relatively large amount), the pore size and porosity of the porous coating layer may be reduced. Meanwhile, if the inorganic particles are present in an amount exceeding 99% by weight (i.e. the binder polymer is present in a very small amount), the peeling resistance of the porous coating layer may be deteriorated. Taking into consideration the functions of the coating layer and the suitability of the coating layer for a high-capacity battery, it is preferred that the porous coating layer be loaded in an amount of 5 to 20 g per square meter ($m^2$) of the non-woven fabric substrate. The pore size and porosity of the porous coating layer are primarily dependent on the size of the inorganic particles. In the case where the inorganic particles have a particle diameter of 1 µm or less, pores having a size of about 1 µm or less are formed. Thereafter, an electrolyte injected into the porous structure plays a role in the transport of ions. If the pore size is smaller than 0.001 µm and the porosity is lower than 10%, the porous coating layer may act as a resistance layer. Meanwhile, if the pore size is larger than 10 µm and the porosity is higher than 90%, the mechanical properties of the porous coating layer may be deteriorated.

The porous coating layer of the separator may further include one or more additives, in addition to the inorganic particles and the polymer.

The present invention also provides a method for manufacturing the separator. Now, a description will be given concerning a non-limiting preferred embodiment of the method according to the present invention.

First, a non-woven fabric substrate having pores is prepared (S1).

Subsequently, fine thermoplastic powder having an average diameter smaller than that of the pores of the non-woven fabric substrate and a melting point lower than the melting point or decomposition point of the non-woven fabric substrate is distributed on at least one surface of the non-woven fabric substrate (S2). The fine thermoplastic powder may be directly distributed on the non-woven fabric using a distributor. Alternatively, a dispersion of the fine thermoplastic powder in a suitable dispersion medium such as water may be distributed on the surface of the non-woven fabric, or the non-woven fabric may be dipped in the dispersion. The distributed fine thermoplastic powder fills in the larger pores of the non-woven fabric substrate.

Then, at least one binder polymer having a melting point or decomposition point higher than the melting point of the fine thermoplastic powder is dissolved in a suitable solvent, and inorganic particles are dispersed in the solution to prepare a slurry. The slurry is coated on the non-woven fabric substrate, on which the fine powder is distributed, followed by drying to form a porous coating layer (S3).

The solvent used to dissolve the binder polymer preferably has a solubility parameter similar to that of the binder polymer and a low boiling point, which is advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane, and water. These solvents may be used alone or as a mixture thereof.

The slurry containing the inorganic particles dispersed therein may be coated on the non-woven fabric substrate by any suitable technique known in the art, for example, dip coating, die coating, roll coating, comma coating or a combination thereof. The porous coating layer may be formed on either one or both surfaces of the non-woven fabric substrate. According to the method of the present invention, the porous coating layer is uniformly formed on the surface of the non-woven fabric substrate. The inorganic particles included in the porous coating layer are fixedly connected to each other by the binder polymer and the pores of the coating layer are formed by interstitial volumes between the inorganic particles.

The present invention also provides an electrochemical device including the separator. The separator is interposed between a cathode and an anode. A gellable polymer may be used as the binder polymer. In this case, upon impregnation with a liquid electrolyte after the separator is assembled into a battery, the gellable polymer reacts with the electrolyte and is then gelled.

The electrochemical device of the present invention may be any device in which electrochemical reactions occur, and specific examples thereof include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

There is no particular restriction on the production method of the cathode and the anode to be applied together with the separator of the present invention. Each of the electrodes can be produced by binding an electrode active material to an electrode current collector by suitable methods known in the art. The cathode active material may be any of those that are commonly used in cathodes of conventional electrochemical devices. Non-limiting examples of particularly preferred cathode active materials include lithium manganese oxides, lithium cobalt oxides, lithium nickel oxides, lithium iron oxides and lithium composite oxides thereof. The anode active material may be any of those that are commonly used in anodes of conventional electrochemical devices. Non-limiting examples of particularly preferred anode active materials include lithium, lithium alloys, and lithium intercalation materials such as carbon, petroleum coke, activated carbon, graphite and other carbonaceous materials. Non-limiting examples of cathode current collectors suitable for use in the electrochemical device of the present invention include aluminum foils, nickel foils and combinations thereof. Non-limiting examples of anode current collectors suitable for use in the electrochemical device of the present invention include copper foils, gold foils, nickel foils, copper alloy foils and combinations thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ or a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during fabrication of the electrochemical device depending on the manufacturing processes and desired physical properties of a final product. Specifically, the electrolyte may be injected before battery assembly or in the final step of battery assembly.

The electrochemical device of the present invention is generally fabricated by winding the separator and the electrodes. Lamination (or stacking) and folding of the separator and the electrodes are also possible.

MODE FOR INVENTION

Hereinafter, preferred embodiments of the present invention will be described in detail with reference to the accompanying drawings. The embodiments of the present invention, however, may take several other forms, and the scope of the invention should not be construed as being limited to the following examples. The embodiments of the present invention are provided to more fully explain the present invention to those having ordinary knowledge in the art to which the present invention belongs.

Example 1

Manufacture of Separator

About 14 μm thick of non-woven fabric was prepared. The non-woven fabric was composed of polyethylene terephthalate microfibers having an average thickness of about 10 μm. The pores of the non-woven fabric had an average diameter of 7 μm and a longest diameter distribution of 1 to 20 μm.

60 wt % of powder (average diameter=0.3 μm) of polyvinylidene fluoride as a thermoplastic polymer was dispersed in water. The non-woven fabric was dipped in and taken out of the aqueous dispersion. The wet non-woven fabric was dried with hot air to remove the water. FIG. 1 is a cross-sectional scanning electron microscope (SEM) image of the resulting substrate. Referring to FIG. 1, the pores of the non-woven fabric substrate 1 were filled with the fine thermoplastic powder 3.

Meanwhile, polyvinylidene fluoride-co-hexafluoropropylene and cyanoethyl polyvinyl alcohol were added in a weight ratio of 10:2 to acetone. The mixture was dissolved at 50° C. for at least about 12 hours to prepare a 5 wt % solution of the binder polymers. $Al_2O_3$ particles and $BaTiO_3$ powder were mixed in a weight ratio of 9:1. The inorganic particles were added to the binder polymer solution until the weight ratio of the binder polymer to the inorganic particles reached 10:90. The inorganic particles were pulverized and dispersed by ball milling to prepare a slurry in which the inorganic particles having an average diameter of about 500 nm were dispersed.

The substrate of FIG. 1 was dipped in the slurry, followed by drying to form a porous coating layer thereon, completing the manufacture of a separator. The porous coating layer was loaded in an amount of about 10 g per square meter ($m^2$) of one surface of the non-woven fabric substrate.

Production of Anode 96 wt % of carbon powder as an anode active material, 3 wt % of polyvinylidene fluoride (PVdF) as a binder and 1 wt % of carbon black as a conductive material were added to N-methyl-2-pyrrolidone (NMP) as a solvent to prepare a slurry. The slurry was applied to a 10 μm thick copper (Cu) foil as an anode collector and dried to produce an anode, which was then roll-pressed.

Production of Cathode 92 wt % of a lithium cobalt composite oxide as a cathode active material, 4 wt % of carbon black as a conductive material and 4 wt % of PVDF as a binder were added to N-methyl-2-pyrrolidone (NMP) as a solvent to prepare a slurry. The slurry was applied to a 20 μm thick aluminum (Al) foil as a cathode collector and dried to produce a cathode, which was then roll-pressed.

Fabrication of Batteries

The separator was interposed between the anode and the cathode to construct an electrode assembly. 1 mole of lithium hexafluorophosphate was dissolved in ethylene carbonate (EC)/propylene carbonate (PC)/diethyl carbonate (DEC) (30:20:50, w/w/w) as organic solvents to prepare an electrolyte. The electrolyte was injected into the electrode assembly. Thereafter, a prismatic battery (capacity=800 mAh) and a cylindrical battery (capacity=1,000 mAh) were fabricated in accordance with standard methods known in the art.

Example 2

A separator was manufactured in the same manner as in Example 1, except that powder (average diameter=0.5 μm) of polystyrene as a thermoplastic polymer was used instead of the polyvinylidene fluoride powder. Thereafter, the procedure of Example 1 was repeated to fabricate a prismatic battery and a cylindrical battery.

Example 3

A separator was manufactured in the same manner as in Example 1, except that powder (average diameter=3 μm) of polyethylene as a thermoplastic polymer was used instead of the polyvinylidene fluoride powder. Thereafter, the procedure of Example 1 was repeated to fabricate a prismatic battery and a cylindrical battery.

Comparative Example 1

A separator was manufactured in the same manner as in Example 1, except that the fine thermoplastic powder was not treated with the aqueous dispersion. Thereafter, the procedure of Example 1 was repeated to fabricate a prismatic battery and a cylindrical battery.

Comparative Example 2

A separator was manufactured in the same manner as in Example 1, except that powder (average diameter=15 μm) of polyethylene as a thermoplastic polymer was used instead of the polyvinylidene fluoride powder. Thereafter, the procedure of Example 1 was repeated to fabricate a prismatic battery and a cylindrical battery.

Test Example 1

Overcharge Test

The prismatic batteries fabricated in Examples 1-3 and Comparative Examples 1-2 were charged at 5.25V/550 mA. The results are shown in Table 1.

TABLE 1

| Example 1 | Example 2 | Example 3 | Comparative Example 1 | Comparative Example 2 |
|---|---|---|---|---|
| No fire and explosion occurred | No fire and explosion occurred | No fire and explosion occurred | Fire and explosion occurred | Fire and explosion occurred |

As can be seen from the results in Table 1, when overcharged, the batteries of Examples 1-3 were kept safe whereas fire and explosion occurred in the batteries of Comparative Examples 1-2.

Test Example 2

Impact Test

The cylindrical batteries fabricated in Examples 1-3 and Comparative Examples 1-2 were charged to 4.4 V. A rod having a diameter of 15.8 mm was placed on each of the batteries. After an object weighing 9.1 kg was dropped from a height of 61 cm onto the rod, the state of the battery was observed. The results are shown in Table 2.

TABLE 2

| Example 1 | Example 2 | Example 3 | Comparative Example 1 | Comparative Example 2 |
|---|---|---|---|---|
| No fire and explosion occurred. No jelly roll eruption | No fire and explosion occurred. No jelly roll eruption | No fire and explosion occurred. No jelly roll eruption | Fire and explosion occurred. Jelly roll erupted | Fire and explosion occurred. Jelly roll erupted |

As can be seen from the results of the impact test in Table 2, the batteries of Examples 1-3 were kept safe, whereas the batteries of Comparative Examples 1-2 caught fire and exploded and the jelly rolls erupted.

Test Example 3

Charge/Discharge Test

Figure 2:
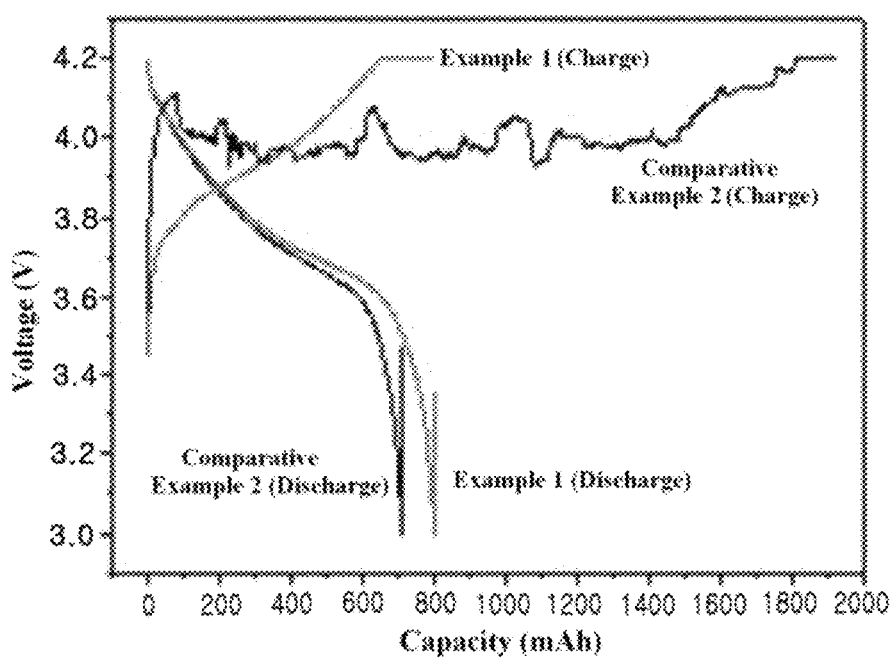
FIG. 2 is a graph showing the charge/discharge characteristics of batteries fabricated in Example 1 and Comparative Example 2.

The prismatic batteries fabricated in Examples 1-3 and Comparative Examples 1-2 were charged/discharged at a rate of 0.2 C. The charge/discharge characteristics of the batteries are shown in FIG. 2.

The battery of Example 1 showed excellent charge/discharge characteristics. In contrast, leakage current was observed in the battery of Comparative Example 2 when charged, and as a result, the constant voltage (CV) region of the curve was lengthened.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A separator having a layered structure comprising;
   (a) a non-woven fabric substrate having pores formed among microfibers constituting the non-woven fabric substrate,
   (b) fine thermoplastic powder filling the pores of the non-woven fabric substrate and having an average diameter smaller than that of the pores of the non-woven fabric substrate and a melting point lower than the melting point or decomposition point of the non-woven fabric substrate, and
   (c) a porous coating layer disposed on at least one surface of the non-woven fabric substrate whose pores are filled with the fine thermoplastic powder and comprising a mixture of inorganic particles and at least one binder polymer whose melting point is higher than the melting point or decomposition point of the thermoplastic powder, the inorganic particles being fixedly connected to each other by the binder polymer and the pores of the coating layer being formed by interstitial volumes between the organic particles,
   wherein the fine thermoplastic powder has ml average diameter of 0.1 to 10 μm; and
   wherein the non-woven fabric substrate is composed of microfibers having an average diameter of 0.5 to 10 μm mad has a pore size distribution in which at least 50% of the pores have a longest diameter of 0.1 to 70 μm.

2. The separator according to claim 1, wherein the non-woven fabric substrate has a melting point or a decomposition point of at least 200° C.

3. The separator according to claim 1, wherein the non-woven fabric substrate is composed of at least one polymer selected from the group consisting of polyester, polyacetal, polyimide, polyether ether ketone, polyethersulfone, polyphenylene oxide, polyphenylene sulfide and polyethylene naphthalate.

4. The separator according to claim 1, wherein the non-woven fabric substrate has a thickness of 9 to 30 μm.

5. The separator according to claim 1, wherein the fine thermoplastic powder has a melting point of 80 to 150° C.

6. The separator according to claim 5, wherein the fine thermoplastic powder has a melting point of 100 to 150° C.

7. The separator according to claim 1, wherein the fine thermoplastic powder is fine powder of at least one polymer selected from the group consisting of polyvinylidene fluoride, polyethylene and polystyrene.

8. The separator according to claim 1, wherein the inorganic, particles have an average diameter of 0.001 to 10 μm.

9. The separator according to claim 1, wherein the binder polymer has a melting point or a decomposition point of at least 200° C.

10. The separator according to claim 1, wherein the binder polymer is selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and mixtures thereof.

11. The separator according to claim 1, wherein the inorganic particles and the binder polymer of the porous coating layer are in a weight ratio of 50:50 to 99:1.

12. The separator according to claim 1, wherein the porous coating layer is loaded in an amount of 5 to 20 g per square meter (m2) of the non-woven fabric substrate.

13. A method for manufacturing a separator according to claim 1, the method comprising
   (S1) preparing a non-woven fabric substrate having pores,
   (S2) distributing fine thermoplastic powder having an average diameter smaller than that of the pores of the non-woven fabric substrate and a melting point lower than the melting point or decomposition point of the non-woven fabric substrate, on at least one surface of the non-woven fabric substrate, and
   (S3) dispersing inorganic particles in a solution of at least one binder polymer whose melting point or decomposition point is higher than the melting point of the fine thermoplastic powder to prepare a slurry, applying the slurry to the non-woven fabric substrate, on which the fine powder is distributed, and drying the slurry to form a porous coating layer, the inorganic particles being fixedly connected to each other by the binder polymer and the pores of the coating layer being formed by interstitial volumes between the inorganic particles.

14. The method according to claim 13, wherein the non-woven fabric substrate has a melting point or a decomposition point of at least 200° C.

15. The method according to claim 13, wherein the fine thermoplastic powder has an average diameter of 0.1 to 10 μm.

16. The method according to claim 13, wherein the time thermoplastic powder has a melting point of 80 to 150° C.

17. The method according to claim 16, wherein the fine thermoplastic powder has a melting point of 100 to 150° C.

18. The method according to claim 13, wherein the fine thermoplastic powder is fine powder of at least one polymer selected from the group consisting of polyvinylidene fluoride, polyethylene and polystyrene.

19. The method according to claim 13, wherein the binder polymer has a melting point or a decomposition point of at least 200° C.

20. An electrochemical device comprising a cathode, an anode and the separator according to claim 1 interposed between the electrodes.

21. The electrochemical device according to claim 20, wherein the electrochemical device is a lithium secondary battery.

22. The separator according to claim 1, wherein the fine thermoplastic powder is polyvinylidene fluoride.

23. The separator according to claim 1, wherein the fine thermoplastic powder is polyethylene, and wherein the fine thermoplastic powder has an average diameter of 0.1 to 3 μm.

24. The separator according to claim 1, wherein the non-woven fabric, is prepared by a process comprising:
   dipping the non-woven fabric into and out of an aqueous dispersion consisting of the fine thermoplastic powder dispersed in water.

* * * * *